United States Patent
Bastiyali

(10) Patent No.: US 12,071,100 B1
(45) Date of Patent: Aug. 27, 2024

(54) SYSTEM INCLUDING A KEY FOB FOR OVERRIDING A LOCK TO OPERATE A DEVICE AND METHOD FOR USING THE SAME

(71) Applicant: Smartsafe Console, LLC, Las Vegas, NV (US)

(72) Inventor: Tarkan Bastiyali, New York, NY (US)

(73) Assignee: Smartsafe Console, LLC, Las Vegas, NV (US)

( * ) Notice: Subject to any disclaimer, the term of this patent is extended or adjusted under 35 U.S.C. 154(b) by 0 days.

(21) Appl. No.: 18/543,855

(22) Filed: Dec. 18, 2023

(51) Int. Cl.
| | | |
|---|---|---|
| B60R 25/24 | (2013.01) | |
| B60R 25/04 | (2013.01) | |
| G03H 1/00 | (2006.01) | |
| G07C 9/00 | (2020.01) | |
| H04W 4/029 | (2018.01) | |

(52) U.S. Cl.
CPC ............. B60R 25/24 (2013.01); B60R 25/04 (2013.01); G03H 1/0011 (2013.01); G07C 9/00309 (2013.01); H04W 4/029 (2018.02); G07C 2009/00793 (2013.01); G07C 2009/00984 (2013.01)

(58) Field of Classification Search
None
See application file for complete search history.

(56) References Cited

U.S. PATENT DOCUMENTS

| | | | | |
|---|---|---|---|---|
| 10,440,633 | B1* | 10/2019 | Bastiyali | B60R 7/087 |
| 11,180,114 | B1* | 11/2021 | Vijithakumara | B60R 25/2009 |
| 11,280,128 | B2* | 3/2022 | Bastiyali | B60R 7/087 |
| 11,315,398 | B2* | 4/2022 | Blaser | B60R 25/1003 |
| 2004/0242224 | A1* | 12/2004 | Janik | H04N 21/41422 455/73 |
| 2005/0090288 | A1* | 4/2005 | Stohr | H04M 1/724 455/566 |
| 2016/0082880 | A1* | 3/2016 | Co | B60Q 1/482 701/2 |
| 2016/0138716 | A1* | 5/2016 | Burca | F16J 15/104 277/648 |
| 2017/0301199 | A1* | 10/2017 | Blaser | G06F 21/31 |
| 2017/0301205 | A1* | 10/2017 | Blaser | H04W 48/02 |
| 2018/0174411 | A1* | 6/2018 | Blaser | H04W 12/082 |
| 2019/0066416 | A1* | 2/2019 | Dhillon | G07F 15/005 |
| 2019/0256049 | A1* | 8/2019 | Jawany | B60R 25/01 |
| 2023/0391958 | A1* | 12/2023 | Fontana | C08G 65/337 |

* cited by examiner

*Primary Examiner* — Carlos Garcia
(74) *Attorney, Agent, or Firm* — Lerner David LLP

(57) ABSTRACT

A system is provided herein, the system including a device, a lock, and a key fob for overriding the lock to allow operation of the device. The key fob includes a housing, a plurality of buttons configured to operate the key fob, and a transceiver configured to send a request signal to a third party and receive an authorization signal from the third party. The key fob is configured to override the lock and allow operation of the device after receipt of the authorization signal. Further provided is a method of overriding a lock to allow operation of a device. Such system and method are useful for preventing a user from operating a device until authorization is received from a third party.

15 Claims, 5 Drawing Sheets

SYSTEM INCLUDING A KEY FOB FOR OVERRIDING A LOCK TO OPERATE A DEVICE AND METHOD FOR USING THE SAME

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to the fields of vehicle safety and electronic devices, and more specifically relates to containment systems for electronic devices.

BACKGROUND

Many vehicle accidents are caused by distracted drivers using electronic devices. Therefore, it is advantageous to provide a system which requires storage of an electronic device, making the electronic device temporarily inaccessible, before allowing operation of the vehicle. Exemplary systems include the smart safe console system disclosed in U.S. Pat. Nos. 10,440,633 and 11,280,128.

However, such systems may undesirably prevent operation of the vehicle in some instances, such as when the electronic device has been lost and cannot be stored in the system. Therefore, a need exists for means of overriding the system and allowing operation of the vehicle without storage of an electronic device.

SUMMARY OF THE INVENTION

The present disclosure provides a system including a device, a lock, and a key fob for overriding the lock to allow operation of the device. The key fob includes a housing, a plurality of buttons configured to operate the key fob, and a transceiver configured to send a request signal to a third party and receive an authorization signal from the third party. The key fob is configured to override the lock and allow operation of the device after receipt of the authorization signal.

In some embodiments, the lock is a smart safe having a first configuration permitting disposition and retrieval of an electronic apparatus within the smart safe and preventing operation of the device and a second configuration preventing disposition and retrieval of the electronic apparatus within the smart safe and permitting operation of the device. In such embodiments, the key fob is configured to override the smart safe in the first configuration and allow operation of the device after receipt of the authorization signal.

In some embodiments, the key fob is configured to prevent entry of fluids into the housing.

In some embodiments, the system further includes a manual key configured to override the lock and allow operation of the device without receipt of the authorization signal.

In some embodiments, the key fob includes a tracking device configured to wirelessly transmit a location of the key fob to the third party.

In some embodiments, one of the plurality of buttons is configured, when depressed, to send an emergency signal.

In some embodiments, one of the plurality of buttons is configured, when depressed, to activate a horn.

In some embodiments, one or more of the plurality of buttons are configured, when depressed, to lock and unlock one or more components of the device without permitting operation of the device.

In some embodiments, one of the plurality of buttons is configured, when depressed, to synchronize the key fob with the device and allow electronic communications therebetween.

In some embodiments, one of the plurality of buttons is configured, when depressed and after receipt of the authorization signal, to remotely activate one or more components of the device.

In some embodiments, the key fob includes a digital screen configured to display information to a user.

In some embodiments, the key fob is configured to generate a hologram to display information to a user.

In some embodiments, the key fob is configured to operate within a distance of 100 feet or less from the lock.

In some embodiments, the key fob is configured to indicate receipt of the authorization signal to a user.

In some embodiments, one or more components of the key fob are constructed out of an antiviral plastic or an antiviral composite.

In some embodiments, the device is a vehicle.

Further provided herein is a method of overriding a lock with a key fob to allow operation of a device. The method includes the steps of preventing operation of the device with the lock, sending a request signal to a third party with the key fob, receiving an authorization signal from the third party with the key fob, and overriding the lock with the key fob to allow operation of the device after receiving the authorization signal.

In some embodiments, the method further includes indicating receipt of the authorization signal to a user with the key fob.

In some embodiments, the overriding is not performed if the authorization signal is not received.

In some embodiments, the device is a vehicle and operation of the device includes driving the vehicle.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

Embodiments of the present disclosure relate to systems for overriding a lock to allow operation of a device, and more particularly to a system and method for allowing a user to drive a vehicle by overriding a smart safe system. The smart safe system (alternatively referred to herein as the "smart safe" and/or the "smart safe lock") prevents operation of a vehicle until an electronic device (also referred to herein as an "electronic apparatus") has been temporarily stored within the smart safe. The system disclosed herein, particularly the key fob disclosed herein, is capable of overriding the smart safe, in order to allow the user to drive the vehicle even when an electronic device has not been stored in the smart safe. In some embodiments, the lock is overridden only in the event that authorization is received from a third party. Thus, the system is particularly useful where the vehicle is owned by a third party but operated by another user, such as a vehicle owned by a parent and used by a child.

Figure 1:
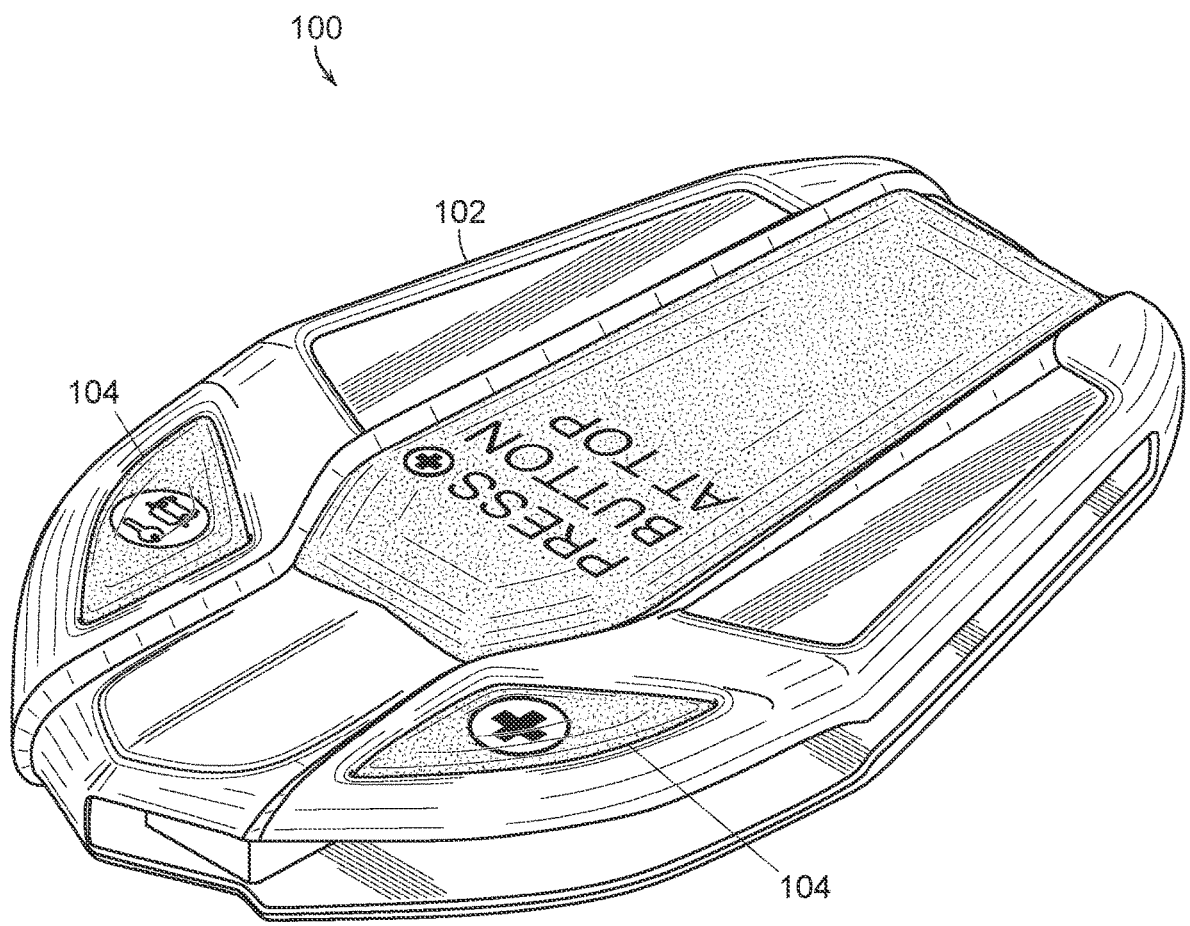
FIG. 1 is a perspective view of a key fob in accordance with the present disclosure.
Figure 2:
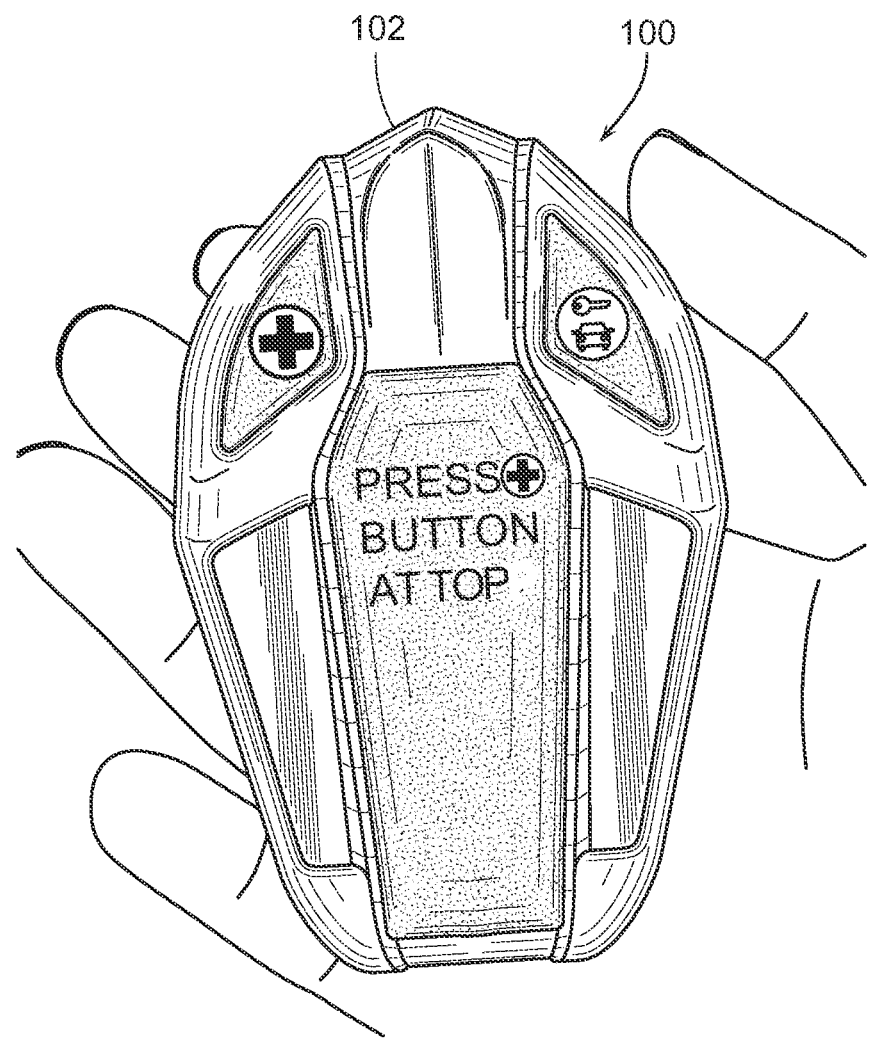
FIG. 2 is a top view of the embodiment shown in FIG. 1.
Figure 3:
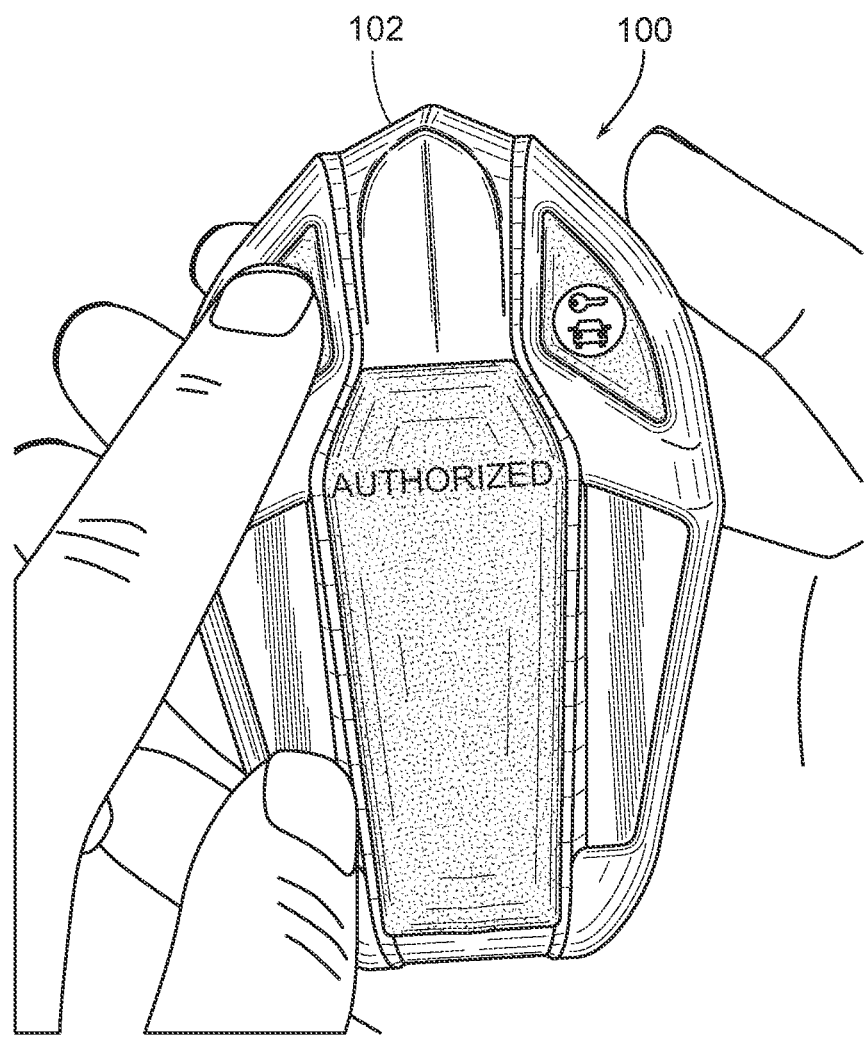
FIG. 3 is a top view of the embodiment shown in FIG. 1, in an alternative configuration
Figure 4:
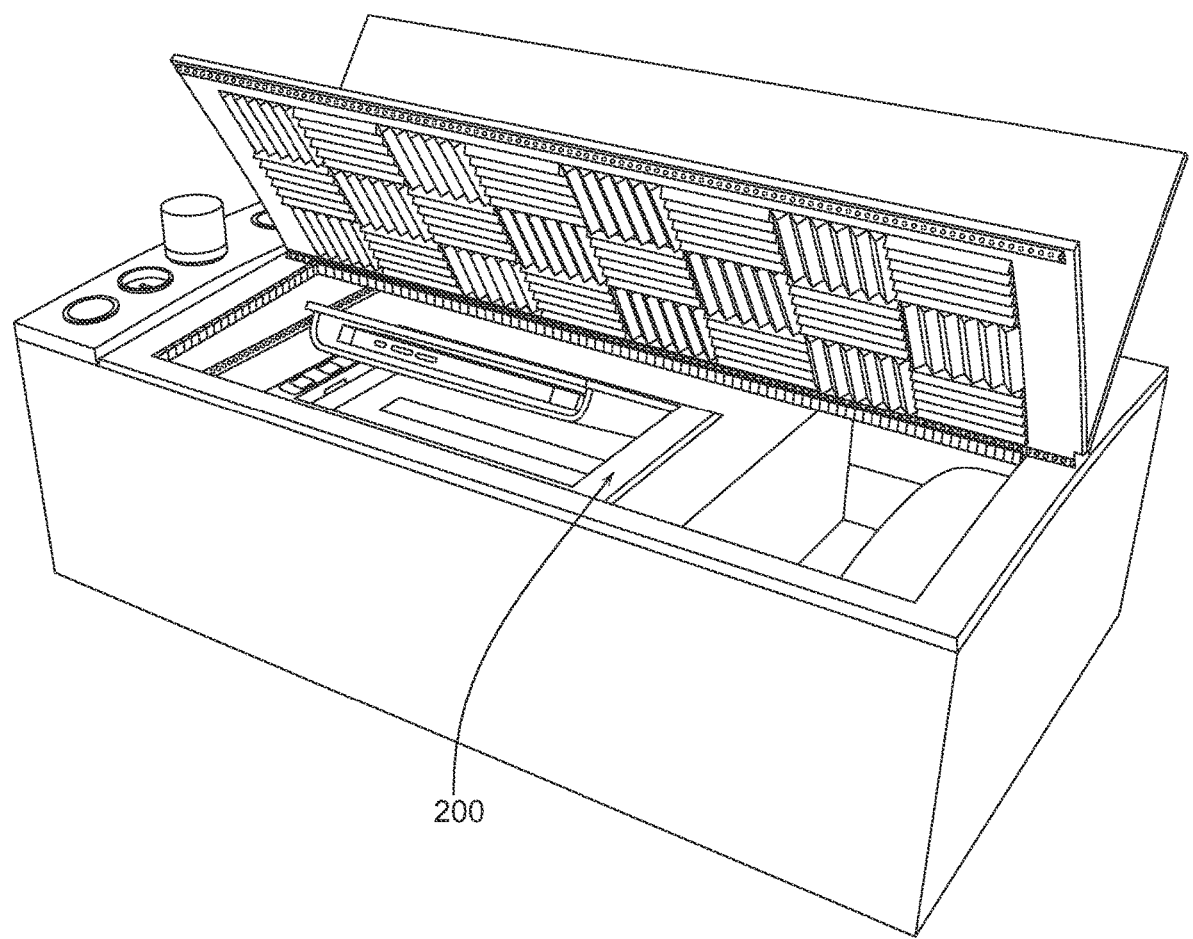
FIG. 4 is a perspective view of an embodiment of a lock in accordance with the present disclosure.
Figure 5:
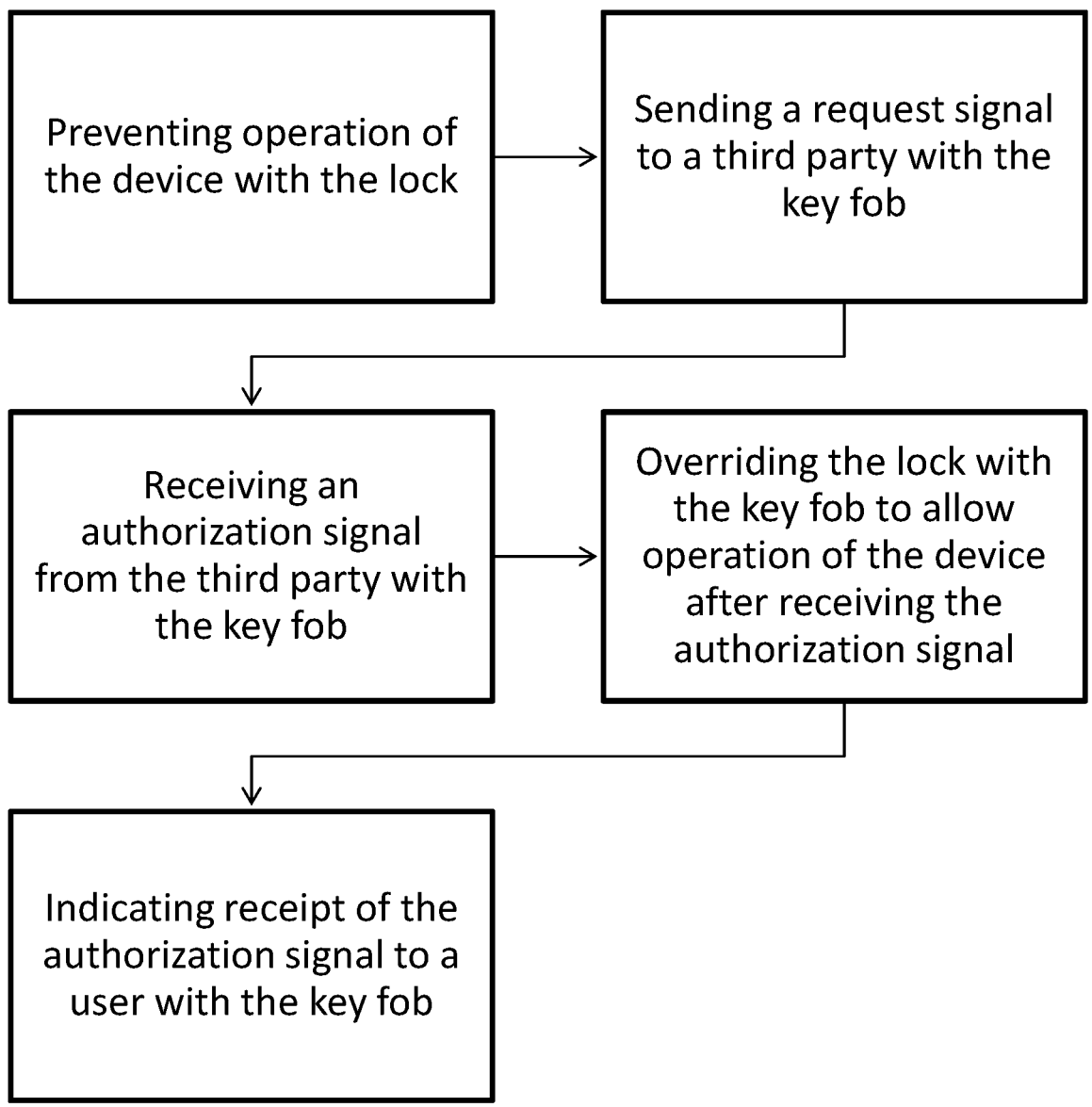
FIG. 5 is a flow chart illustrating a method in accordance with the present disclosure.

FIG. 1, FIG. 2, and FIG. 3 all show a key fob 100 according to one or more embodiments of the present disclosure. As illustrated in FIG. 1, the key fob 100 includes a housing 102 and a plurality of buttons 104 configured to operate the key fob 100. The housing 102 may be configured to prevent ingress of fluids into an interior of the housing 102, where such fluids could undesirably contacts the plurality of buttons 104 or other interior components of the key fob 100. For example, the key fob 100 may be waterproof.

The key fob 100 further includes a transceiver (not shown in FIG. 1) configured to send a request signal to a third party and receive an authorization signal from the third party. The size, shape, orientation, and configuration of key fob components such as the housing 102, the plurality of buttons 104, and the transceiver are not particularly limited to what is illustrated in FIG. 1. Those skilled in the art will appreciate that any suitable configuration of key fob components which allows a user to operate the key fob 100 is within the scope of the present disclosure. In some embodiments, one or more components of the key fob 100 are independently, fully or partially, constructed of a recycled material, a lightweight material, a waterproof material, an antiviral plastic, an antiviral composite, or a combination thereof.

Antiviral materials may be capable of killing 99.9999% of viruses such as the SARS-CoV-2 virus on material surfaces in 60 minutes or less. Featured in these figures is digital screen 108, which can be configured to display messages to the user about the status of the unlock of a vehicle, or other aspects of operating the apparatus in accordance with the present disclosure or performing of the method in accordance with the present disclosure.

In some embodiments, the third party includes a third party individual and a third party device. The third party device may be an electronic device known to those skilled in the art which is configured to send authorization signals to the transceiver and receive request signals from the transceiver. For example, the third party device may be a cellular phone. In some embodiments, the third party device is configured to send a denial signal to the transceiver in response to a request signal therefrom.

The system and/or key fob 100 may include additional components and features described below but not shown in FIG. 1.

In some embodiments, the system includes a manual key configured to override the lock without receipt of the authorization signal. The manual key may be connected to or part of the key fob 100 or may be physically independent from the key fob 100. If the key fob 100, lock, and device are incapable of establishing and maintaining wireless communication, the key fob 100 might be incapable of sending and receiving the signals necessary to override the lock on demand of a user. Thus, the manual key provides another means of overriding the lock, for example if the key fob 100 loses power.

In some embodiments, the key fob 100 includes a tracking device configured to wirelessly transmit a location of the key fob 100 to the third party. Such location information may assist the third party in deciding whether to authorize operation of the device, and may generally be useful in providing to the third party the current location of the key fob 100 and thus the location of a user in possession of the key fob 100.

In some embodiments, the key fob 100 is configured to indicate receipt of the authorization signal to the user, alerting the user that the lock has been or may then be overridden. The key fob 100 may be configured to send information to the user, such as receipt of the authorization signal, overriding of the lock, contact information of the user and/or third party, or a combination thereof, though such information is not limited thereto. Components and methods for indicating the authorization receipt to the user are not particularly limited. In some embodiments, the key fob 100 includes a digital screen configured to display information to the user. In some embodiments, the key fob 100 is configured to generate a hologram to display information to the user.

In some embodiments, the key fob 100 includes a battery for supplying power to the key fob 100, such as a lithium battery, though the battery is not limited thereto.

The key fob 100 includes a plurality of buttons 104 which allow a user to perform various functions with respect to the lock and the device when each button is depressed. In some embodiments, one of the plurality of buttons 104 is configured to send an emergency signal to the third party or emergency responders, i.e., an emergency button. In some embodiments, one of the buttons 104 is configured to activate a horn, i.e., a panic button.

In some embodiments, one or more of the buttons 104 are configured to lock and/or unlock one or more components of the device without permitting operation of the device, i.e., a lock and/or unlock button(s). In embodiments where the device is a vehicle, such lock and unlock buttons allow the user to lock and unlock the doors of the vehicle without permitting the user to operate the vehicle, such operations including, for example, driving the vehicle, starting the engine, or shifting the gear. The key fob 100 may further include a button configured to open and close a trunk of the vehicle, i.e., a trunk button.

In some embodiments, one of the buttons 104 is configured to synchronize the key fob 100 with one or more of the lock and the device, i.e., a sync button. Synchronization allows the key fob 100 to wirelessly and electronically communicate with the lock and/or device, facilitating the overriding of the lock when the key fob 100 receives the authorization signal. The key fob 100 may desynchronize with a lock and/or device to allow synchronization to a different lock and/or device. The key fob 100 can also be synchronized with a smartphone application to send and receive signals such as the request and authorization signals. Such a smartphone application may be used by the third party to grant or deny authorization to operate the device. In some embodiments, the key fob 100 has an operating range of 50 feet or greater, 75 feet or greater, 100 feet or greater, 100 feet or less, 200 feet or less, or 500 feet or less. Within the above operating ranges, the key fob 100 reliably stays synchronized with the lock and/or device. Outside of the above operating ranges, the key fob 100 may lose connection and be unable to maintain synchronization.

In some embodiments, one of the buttons 104 is configured to remotely activate one or more components of the device after receipt of the authorization signal, i.e., a remote start button. Such a remote start button is particularly useful in embodiments where the device is a vehicle. The remote start button may require receipt of the authorization signal, use of the manual key, or other means of overriding of the lock before starting the device and allowing its operation. In some embodiments, the key fob is also configured to be able to turn the device off in addition to remotely starting said device.

In some embodiments, the lock is an electronic lock. In some further embodiments, the electronic lock is a smart safe system as described in U.S. Pat. Nos. 10,440,633 and 11,280,128, the contents of both of which incorporated by reference herein. The key fob 100 is particularly useful in connection with an electronic lock such as the smart safe system. However, those skilled in the art will appreciate that the present disclosure is not limited to electronic locks and that the applicability of the key fob 100 is not limited to overriding electronic locks.

The smart safe system may have a first configuration permitting disposition and retrieval of an electronic apparatus within the smart safe and preventing operation of the device, and a second configuration preventing disposition and retrieval of the electronic apparatus within the smart safe and permitting operation of the device. In embodiments where the device is a vehicle, the smart safe allows the electronic apparatus to be stored and retrieved while the vehicle is inoperable, and the smart safe renders the electronic apparatus inaccessible to the user while the vehicle is in operation. In such embodiments, the key fob 100 is configured to override the smart safe in the first configuration and allow operation of the device after receipt of the authorization signal. The key fob 100 thus allows the vehicle to be operated even when the electronic apparatus is not sealed in the smart safe, effectively overriding the locking functionality of the smart safe. The key fob 100 may immediately override the lock or do so after a delay, and further may automatically override the lock or do so only upon user input.

In some embodiments the device to be operated is a vehicle, such as an automobile. In such embodiments, the key fob may be equipped with fittings to be secured within the vehicle, such as in a glove compartment. Such fittings may be constructed fully or partially out of plastic and other suitable materials known to those of skill in the art. As discussed above, the key fob 100 is particularly useful in connection with the smart safe and a vehicle. However, those skilled in the art will appreciate that the present disclosure is not limited to devices such as vehicles and that the applicability of the key fob 100 is not limited to vehicles. For instance, the key fob 100 is generally applicable as a secondary or even primary means of unlocking a lock.

Further provided herein is a method of overriding a lock preventing operation of a device using a key fob. The lock, device, and key fob may be the same as described and illustrated in the embodiments above, and therefore the description of these components is omitted here. The method includes preventing operation of the device with the lock, sending a request signal to a third party with the key fob, receiving an authorization signal from the third party with the key fob, and overriding the lock with the key fob to allow operation of the device after receiving the authorization signal.

In some embodiments, the method further includes a step of indicating receipt of the authorization signal to the user. The key fob may include one or more components for indicating the authorization to the user as discussed above, such as a digital screen, a hologram, an icon, a ringer, a vibrator, other suitable components known to those skilled in the art, or a combination thereof.

In some embodiments, the overriding is not performed if the authorization signal is not received. Until the third party sends authorization, the user cannot operate the device. The key fob and smart safe therefore help to prevent distracted driving, because the user can only drive the vehicle by storing the electronic device in the smart safe or, in the event that the electronic device is not currently accessible to the user, by requesting and receiving authorization from the third party to override the smart safe.

In some embodiments, the key fob is equipped with an "SOS" button which is configured to transmit an electronic distress signal to 911 and/or a selected contact such as a spouse or parent. Embodiments also exist where the key fob in accordance with the present disclosure is equipped with a verification icon that can indicate multiple colors depending on the verification status. For example, the verification icon can turn green with a third party user authorizes access to the device such as a vehicle. Further embodiments exists where the key fob in accordance with the present disclosure is equipped with an emergency button which, when depressed, will send a text and/or email to a designated third party such as a spouse or parent.

In some embodiments, the key fob in accordance with the present disclosure is compatible with a software application on a mobile phone. This software information can store and transmit contact information about the user of a vehicle as well as any administrator of the vehicle. Embodiments exist where the key fob in accordance with the present disclosure is equipped with a vibration mechanism, configured to alert a user when authorization to use the device has been given.

In embodiments where the key fob in accordance with the present disclosure is equipped with a lock button and a remote start button various methods of remotely starting an associate device are contemplated by the present disclosure. One such method involves holding down said remote start button for at least 3 seconds, while other embodiments of this method include the remote start button is held down for approximately 3 seconds to initiate the remote start. In other related embodiments, this method comprises pressing the unlock button twice and then holding the remote start button for approximately 3 seconds. Alternatively, the remote start button can be pressed 3 or 4 times to remotely start the device. Additionally, the device may be started by a user first pressing the lock button for approximately 2 seconds and then holding the remote start button for approximately 4 seconds.

The key fob in accordance with the present disclosure can be preferably constructed out of graphene-thermoplastic polyurethane (G-TPU) or any other material with anti-viral and/or anti-microbial properties.

The method may include particular steps not described herein, such as specific sequences and durations of buttons a user must press to operate the device in various ways. Such specificities of using the key fob are known to those of ordinary skill in the art and descriptions thereof are omitted.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

For purposes of the present disclosure of the invention, unless specifically disclaimed, the singular includes the plural and vice-versa, the words "and" and "or" shall be both conjunctive and disjunctive, the words "any" and "all" shall both mean "any and all".

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

What is claimed is:

1. A system comprising a device, a lock, and a key fob for overriding the lock to allow operation of the device, the key fob comprising:
   a housing;
   a plurality of buttons configured to operate the key fob; and
   a transceiver configured to send a request signal to a third party and receive an authorization signal from the third party;

wherein the key fob is configured to override the lock and allow operation of the device after receipt of the authorization signal, wherein the lock comprises a smart safe, wherein the smart safe has a first configuration permitting disposition and retrieval of an electronic apparatus within the smart safe and preventing operation of the device, wherein the smart safe has a second configuration preventing disposition and retrieval of the electronic apparatus within the smart safe and permitting operation of the device, and wherein the key fob is configured to override the smart safe in the first configuration and allow operation of the device after receipt of the authorization signal.

2. The system of claim 1, wherein the key fob is configured to prevent entry of fluids into the housing.

3. The system of claim 1, further comprising a manual key configured to override the lock and allow operation of the device without receipt of the authorization signal.

4. The system of claim 1, wherein the key fob comprises a tracking device configured to wirelessly transmit a location of the key fob to the third party.

5. The system of claim 1, wherein one of the plurality of buttons is configured, when depressed, to send an emergency signal.

6. The system of claim 1, wherein one of the plurality of buttons is configured, when depressed, to activate a horn.

7. The system of claim 1, wherein one or more of the plurality of buttons are configured, when depressed, to lock and unlock one or more components of the device without permitting operation of the device.

8. The system of claim 1, wherein one of the plurality of buttons is configured, when depressed, to synchronize the key fob with the device and allow electronic communications therebetween.

9. The system of claim 1, wherein one of the plurality of buttons is configured, when depressed and after receipt of the authorization signal, to remotely activate one or more components of the device.

10. The system of claim 1, wherein the key fob comprises a digital screen configured to display information to a user.

11. The system of claim 1, wherein the key fob is configured to generate a hologram to display information to a user.

12. The system of claim 1, wherein the key fob is configured to operate within a distance of 100 feet or less from the lock.

13. The system of claim 1, wherein the key fob is configured to indicate receipt of the authorization signal to a user.

14. The system of claim 1, wherein one or more components of the key fob are constructed out of an antiviral plastic or an antiviral composite.

15. The system of claim 1, wherein the device is a vehicle.

* * * * *